Patented June 8, 1943

2,321,451

UNITED STATES PATENT OFFICE 2,321,451

WATER-SOLUBLE CONDENSATION PRODUCT

Rudolf Bauer, Cologne-Deutz, Germany, assignor, by mesne assignments, to General Aniline & Film Corporation, New York, N. Y., a corporation of Delaware No Drawing. Application July 21, 1939, Serial No. 285,677. In Germany July 25, 1938

8 Claims. (Cl. 260—42)

The present invention relates to water-soluble condensation products from organic compounds being capable of condensation with aldehydes or ketones, and to processes for producing the same.

It is known that difficultly soluble to insoluble products are obtained by the reaction of organic compounds being capable of condensation with saturated aldehydes or ketones. I have found that new valuable water-soluble products are obtained if the said reaction is carried out with addition of unsaturated aldehydes or ketones and sulfurous acid. Whereas, for instance, by the reaction of saturated aldehydes or ketones with phenols or urea or similar amino compounds water-insoluble resins are finally produced, it is possible to obtain products being soluble in water by simultaneously using unsaturated aldehydes or ketones and sulfurous acid. The solubility of the products obtained in this way varies somewhat depending on the relative proportions of the saturated and unsaturated aldehydes or ketones being employed. By using large quantities of saturated aldehydes or ketones there are obtained products which are somewhat more difficultly water-soluble and can be precipitated from their aqueous solutions by aluminium salts. But if large quantities of unsaturated and small quantities of saturated aldehydes or ketones are used, the products become more easily soluble and can no longer be precipitated by aluminium salts. Similar variations exist with regard to the solubility of the products in organic solvents.

For the process of my invention, especially such compounds capable of condensation come into consideration which react already in an aqueous medium. Compounds of this kind are, for instance, aromatic hydroxy- or thio-compounds, such as phenol, its homologues and derivatives, naphthol, its homologues and derivatives, thiophenols, amino compounds such as urea, dicyandiamide, melamine, acid amides as for instance, toluene sulfamide, aromatic amino compounds as for instance aniline or naphthylamine, products of high molecular weight such as polyvinly alcohol, moreover gelatine, products containing lignin, tanning extracts as for instance quebracho. Furthermore, there come into consideration sulfonic acids of hydrocarbons and their derivatives, such as naphthalenesulfonic acid or cresolsulfonic acid.

As saturated aldehydes there may be used, for instance, formaldehyde, butyraldehyde, benzaldehyde and so on, as saturated ketones acetone, methylethylketone and so on, as unsaturated aldehydes, for instance, acrolein, croton-aldehyde, cinnamic-aldehyde, as unsaturated ketones vinylmethyl-ketone, mesityl-oxide.

The process may be carried out by means of treating the compound or mixture of compounds being capable of condensation with a mixture of a saturated and unsaturated aldehyde or ketone (for instance formaldehyde and crotonaldehyde) and sulfurous acid at a temperature of 100° C. until the reaction product has become water-soluble. The reaction generally proceeds in an aqueous medium, but it can be also carried out in the presence of water-soluble organic solvents, if desired, in the presence of acid condensation agents, as for instance, hydrochloric acid. Instead of working at the boiling point, it is also possible to carry out the reaction in a closed vessel at temperatures higher than the boiling point. Instead of sulfurous acid, neutral or, preferably, acid sulfurous acid salts in the presence of mineral acid may also be employed.

The products obtainable according to the present process are suitable for various purposes, depending on the nature and relative proportion of the starting materials and also on the reaction conditions, for instance as finishing agents, for crease-proofing textile fabrics, as tanning agents, as starting materials for synthetic resins or pressed masses and so on; especially valuable products are obtained, if the reaction is carried out with mixtures of different materials capable of condensation.

Example 1

94 parts of phenol are heated to 100° C. with a mixture of 24 parts of acetaldehyde and 430 parts of a solution having been prepared by treating 66 parts of cinnamic aldehyde in 300 parts of water with 66 parts of sulfurous acid. After 5 hours the reaction is complete. The reaction product which is easily soluble in water, is brought to a pH of 3 by adding ammonia and acetic acid. By tanning therewith, a soft and compact leather is obtained having similar properties as a leather which has been prepared by using vegetable tanning extracts.

Example 2

350 parts of crude cresol and 60 parts of urea are heated to 100° C. with a mixture of 150 parts of aqueous formaldehyde of 30% and 800 parts of an aqueous solution having been prepared by treating 117 parts of croton-aldehyde with 215 parts of sulfurous acid in 470 parts of water. After 5 hours the reaction product has become easily soluble in water. On drying there is obtained a light yellow water-soluble resin which may be employed as a mordant for textile fibres.

Example 3

Into a mixture of 340 parts of water and 85 parts of croton-aldehyde, 160 parts of sulfurous acid are introduced. Thereto 300 parts of acetone and 400 parts of phenol are added, and the mixture is heated in a closed vessel to 130° C. for 8 hours. An easily water-soluble condensation product is obtained.

Example 4

208 parts of β-naphthalenesulfonic acid, 216 parts of crude cresol and 600 parts of water are heated to 95° C. and treated with a mixture of 100 parts of formaldehyde and 585 parts of a solution having been prepared by passing 160 parts of sulfurous acid into a mixture of 340 parts of water and 85 parts of croton-aldehyde. The mixture is heated to 100° C. for 5 hours. An easily water-soluble condensation product is obtained which may be used for tanning after having been brought to a suitable pH-value by adding ammonia and acetic acid.

Example 5

1000 parts of 50% sulfite waste liquor of pine wood, having been prepared by treating the crude sulfite waste liquor (which contains lime) with sulfuric acid, are treated with 150 parts of phenol, 75 parts of formaldehyde and 240 parts of a solution having been prepared by passing 65 parts of sulfurous acid into a mixture of 140 parts of water and 35 parts of croton-aldehyde. The mixture is heated to 80° C. for 10 hours. A condensation product being easily soluble in water is obtained which may be used for tanning after having been brought to a suitable pH value by adding ammonia and acetic acid.

Example 6

A mixture of 290 parts of phenol and 106 parts of benzaldehyde is treated at 95° C. with 720 parts of a solution having been prepared by introducing 195 parts of sulfurous acid into a mixture of 420 parts of water and 105 parts of croton-aldehyde. After heating to a temperature of 100° C. for 2 hours, a water-soluble condensation product is obtained which may be used for tanning after having been brought to a suitable pH value by adding ammonia and acetic acid. A well filled leather being distinguished by a soft feel is obtained.

Example 7

Into a mixture of 170 parts of croton-aldehyde and 680 parts of water, 315 parts of sulfurous acid are introduced. To this mixture 190 parts of 30% aqueous formaldehyde are added, and the mixture is added to 450 parts of crude cresol at 100° C. After heating for 4 hours, a water-soluble condensation product is obtained which can be used for tanning after having been brought to a suitable pH value by adding ammonia and acetic acid. A soft and well filled leather is obtained.

Example 8

50 parts of polyvinylalcohol are dissolved in 450 parts of warm water; into the viscous solution there are introduced 25 parts of urea, 100 parts of formaldehyde of 30% and 480 parts of a solution having been prepared by the reaction of 70 parts of croton-aldehyde with 130 parts of sulfurous acid and 280 parts of water. The homogeneous solution thus obtained is heated, while stirring, to 100° C. for two hours. A clearly water-soluble condensation product is obtained which may be employed for sizing, finishing and printing purposes.

Example 9

120 parts of urea are introduced into 250 parts of 30% aqueous formaldehyde. Thereupon the the mixture is added, while stirring, to 500 parts of a solution having been prepared by the reaction of 70 parts of croton-aldehyde with 130 parts of sulfurous acid in 280 parts of water. On heating in the water bath, the resin, which precipitates in the beginning, is dissolved again. After about 1 hour, the condensation product is water-soluble.

Example 10

Into a mixture of 470 parts of phenol, 540 parts of crude cresol German pharmacopoeia 4th Edition, 2000 parts of water, 300 parts of formaldehyde and 350 parts of croton-aldehyde there are introduced at ordinary temperature 800 parts of sulfurous acid. The temperature rises to about 50° C. Thereupon the whole is heated to 100° C. for 4 more hours until the reaction product has become clearly water-soluble. It has similar properties as the product described in Example 7.

Example 11

300 parts of a 10% aqueous solution of polyvinylalcohol are mixed with 50 parts of phenol; to this mixture there are added 25 parts of formaldehyde and 150 parts of a solution having been prepared by the reaction of 22 parts of croton-aldehyde with 40 parts of sulfurous acid and 88 parts of water. Thereupon the whole is heated in a boiling water bath. After 2 hours the product is homogeneous and clearly water-soluble.

Example 12

100 parts of quebracho ordinary are dissolved with 150 parts of hot water. 30 parts of urea are added and the whole is treated with a mixture of 150 of a solution, having been prepared by the reaction of 22 parts of croton-aldehyde with 40 parts of sulfurous acid in 88 parts of water, and 20 parts of acetaldehyde. Thereupon the whole is heated in a boiling water bath. The resin which precipitates in the beginning dissolves, and after heating for 3 hours a clearly water-soluble condensation product is obtained which may be used for tanning after having been brought to a suitable pH value by adding ammonia and acetic acid.

Example 13

84 parts of dicyandiamide are heated in a water bath together with 50 parts of 30% aqueous formaldehyde and an aqueous solution of the reaction product of 70 parts of croton-aldehyde with 130 parts of sulfurous acid. In the beginning, on adding water, an insoluble white resin precipitates which becomes water-soluble on heating to 100° C. for 2 hours.

Example 14

To 940 parts of phenol there is added at 70° C. a mixture of 700 parts of 30% aqueous formaldehyde and 1000 parts of an aqueous solution of the reaction product of 140 parts of croton-aldehyde with 260 parts of sulfurous acid; then the whole is heated, while stirring, to 90° C. As soon as the reaction product has become homogeneous and clearly water-soluble the mixture is cooled by addition of water. There is obtained a jellylike mass being easily water-soluble and being precipitable from its aqueous solution by aluminium sulfate. By heating to higher temperatures, in the presence of filling materials and, if desired, of formaldehyde, the product can be worked up into artificial masses.

I claim:

1. The water-soluble products of the simultaneous condensation in an acid medium of an aromatic compound selected from the class consisting of phenols and thiophenols with a saturated carbonyl compound selected from the group consisting of saturated aldehydes and ketones and an unsaturated carbonyl compound selected from the class consisting of unsaturated aldehydes and ketones and sufficient sulfurous acid to insure the water-solubility of said condensation products.

2. As new products the water-soluble products of the simultaneous condensation in an acid medium of a phenol, a saturated carbonyl compound selected from the group consisting of saturated aldehydes and ketones, an unsaturated carbonyl compound selected from the group consisting of unsaturated aldehydes and ketones, and sufficient sulfurous acid to insure water-solubility of the condensation product.

3. As new products the water-soluble products of the simultaneous condensation in an acid medium of a phenol, formaldehyde, crotonaldehyde, and sulfurous acid.

4. As new products, the water-soluble products of the simultaneous condensation in an acid medium of phenol, formaldehyde, crotonaldehyde, and sulfurous acid.

5. As new products the water-soluble products of the simultaneous condensation in an acid medium of a cresol, formaldehyde, crotonaldehyde, and sulfurous acid.

6. The process of preparing water-soluble condensation products which comprises treating, in an acid aqueous medium, a phenol with formaldehyde, crotonaldehyde, and with sulfurous acid, at least until the resulting product is water-soluble.

7. The process of preparing water-soluble condensation products which comprises condensing in an acid medium, an aromatic compound selected from the class consisting of phenols and thiophenols with a saturated carbonyl compound selected from the class consisting of saturated aldehydes and ketones and with an unsaturated carbonyl compound selected from the class consisting of unsaturated aldehydes and ketones and with sufficient sulfurous acid and for such time as to insure water-solubility of said condensation product.

8. The process as defined in claim 7 wherein the aromatic compound is phenol.

RUDOLF BAUER.